United States Patent [19]

Ogawa

[11] Patent Number: 5,449,554

[45] Date of Patent: Sep. 12, 1995

[54] ANTISTATIC FILM AND METHOD OF MANUFACTURING THE SAME

[75] Inventor: Kazufumi Ogawa, Nara, Japan

[73] Assignee: Matsushita Electric Industrial Co., Ltd., Osaka, Japan

[21] Appl. No.: 110,704

[22] Filed: Aug. 20, 1993

[30] Foreign Application Priority Data

Aug. 31, 1992 [JP] Japan ................... 4-230870

[51] Int. Cl.$^6$ ............................................. B32B 7/04
[52] U.S. Cl. ................................. 428/333; 427/399;
427/402; 428/245; 428/288; 428/289; 428/429;
428/450; 428/451; 428/452; 428/688; 428/922
[58] Field of Search ............... 427/399, 402; 428/245,
428/288, 289, 429, 450, 451, 452, 333, 688, 922

[56] References Cited

U.S. PATENT DOCUMENTS

| | | | |
|---|---|---|---|
| 4,283,476 | 8/1981 | Farnsworth et al. | 430/140 |
| 4,539,061 | 9/1985 | Sagiv | 156/278 |
| 5,091,468 | 2/1992 | Takeuchi | 524/761 |

FOREIGN PATENT DOCUMENTS 0091741 10/1983 European Pat. Off. .
2410029 6/1979 France .

OTHER PUBLICATIONS

European Search Report (Application No. EP93113927), Dec. 17, 1993.

*Primary Examiner*—D. S. Nakarani
*Attorney, Agent, or Firm*—Fish & Richardson

[57] ABSTRACT

In a molecule of a monomolecular film, a metal complex is introduced to form an antistatic film. This film is desirably transparent, durable, extremely thin and weakly conductive.

The method of manufacturing an antistatic film involves (i) exposing a substrate with an active hydrogen atom thereon to a chemical adsorbent containing a straight carbon-chain group with a silyl group at one end and a phosphonate or carboxyl group at the other end to form a chemically adsorbed monomolecular film, and (ii) soaking the monomolecular film in a solution of a metal salt to form a film containing a complex of the metal element. An antistatic multi-monomolecular film can also be formed by laminating the monomolecular films using hydroxyl groups each bonding to the metal element in each monomolecular film.

12 Claims, 2 Drawing Sheets

ANTISTATIC FILM AND METHOD OF MANUFACTURING THE SAME

FIELD OF THE INVENTION

The invention relates to a transparent, durable and antistatic film and a method of manufacturing the same. Particularly, the invention relates to an antistatic film comprising a monomolecular film or a multi-layer film built up from monomolecular films and a method of manufacturing the same.

BACKGROUND OF THE INVENTION

Forming a transparent, durable and desirably conductive antistatic film on a substrate is important to keep insulating substrates of industrial materials, vehicles and electronics products from gathering dust. Conventional insulating members for industrial materials, vehicles, electrical products and the like can easily become electrically charged in use. Such charged members, in turn, attract dust particles in air. Surface contamination by charging occurs on many articles such as cathode-ray tubes, automobiles, industrial materials, household appliances, etc. To prevent electrostatic charging, conductive resins or films have been used to cover the surface of glass or plastic products. For example, a conductive ceramic such as ITO (indium-tin oxide) film was deposited particularly on glass products.

The use of the conductive resins or films, however, has some problems, e.g., inferior transparency, peeling-off and susceptibility to scars and scratches. Also, the deposition of ITO film was costly although it was possible to obtain high reliability.

SUMMARY OF THE INVENTION

An object of the invention is to provide an antistatic film comprising molecules with a straight carbon-chain group, which are chemically adsorbed and bonded to a substrate via a covalent bond. This film is selected from the group consisting of a monomolecular film and a multi-monomolecular film, in which the molecule with a straight carbon-chain group has at least one metal complex selected from the group consisting of a metal-phosphate complex and a metal-carboxy complex at its end.

It is preferable in the invention that the antistatic film comprises a multi-monomolecular film, and that the molecule with a straight carbon-chain group has any one group selected from the group consisting of a phosphate group and a carboxyl group at both ends, and the molecule further has a metal molecule between the selected phosphate or carboxyl groups at the ends and the remainder of the molecule.

It is also preferable in the invention that the metal in the metal complex is a transition metal element.

It is also preferable in the invention that the metal element is at least one metal selected from the group consisting of Zr, Hf, Cr, Zn and Al.

It is also preferable in the invention that the substrate is made of at least one material selected from the group consisting of plastics, ceramics, glass, metal, inorganic substances, semiconductors, resins, rubber, fiber, paper and fabrics.

Another object of the invention is to provide a method of manufacturing an antistatic film comprising the steps of subjecting a substrate with an active hydrogen atom on the surface to a condensation reaction with a chemical adsorbent containing a straight carbon-chain group with a silyl group at its end and one group selected from the group consisting of a phosphonate group and a carboxyl group at the other end to form a monomolecular film, and soaking the monomolecular film in a solution of a metal salt to react one group selected from the group consisting of a phosphonate group and a carboxyl group on the monomolecular film with the metal salt to make a metal complex.

It is preferable in the invention that the metal complex is made of a metal salt, and a phosphonate group or a carboxyl group on the monomolecular film soaked in the solution of the metal salt, and then a multi-molecular film is formed by repeatedly laminating each monomolecular film of the molecules each having one group selected from the group consisting of a phosphonate group and a carboxyl group at both ends a plurality of times.

It is also preferable in the invention that the straight carbon-chain group in the chemical adsorbent is at least one compound selected from the group consisting of:

(A) a compound represented by the following Formula (1), comprising a straight carbon-chain group with a phosphonate group at its end and a silylmethoxy group at the other end:

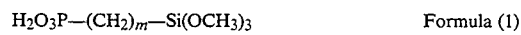

$$H_2O_3P-(CH_2)_m-Si(OCH_3)_3 \qquad \text{Formula (1)}$$

wherein m denotes an integer of 1 to 30;

(B) a compound represented by the following Formula (2), comprising a straight carbon-chain group with a phosphonate group at its end and a thiol group at the other end:

$$H_2O_3P-(CH_2)_n-SH \qquad \text{Formula (2)}$$

wherein n denotes an integer of 1 to 30;

(C) a compound represented by the following Formula (3), comprising a straight carbon-chain group with a phosphonate group at both ends:

$$H_2O_3P-(CH_2)_u-PO_3H_2 \qquad \text{Formula (3)}$$

wherein u denotes an integer of 1 to 30;

(D) a compound represented by the following Formula (4), comprising a straight carbon-chain group with an ester bond at its end and a chlorosilyl group at the other end:

$$R-OOC(CH_2)_vSiCl_3 \qquad \text{Formula (4)}$$

wherein R represents a $C_{1-6}$ lower alkyl group, and v denotes an integer of 1 to 25; and (E) a compound represented by the following Formula (5), comprising a straight carbon-chain group with a carboxyl group at both ends:

$$HOOC-(CH_2)_w-COOH \qquad \text{Formula (5)}$$

wherein w denotes an integer of 1 to 30.

It is also preferable in the invention that the chemical adsorbent contains a compound represented by the following Formula (4), comprising a straight carbon-chain group with an ester bond at its end and a chlorosilyl group at the other end:

$$R-OOC(CH_2)_vSiCl_3 \qquad \text{Formula (4)}$$

wherein R represents a $C_{1-6}$ lower alkyl group, and v denotes an integer of 1 to 25, and wherein the chemical adsorbent is bonded to a surface of the substrate via covalent bonds and then, the ester bond is changed to form a carboxy group with an acid.

It is also preferable in the invention that the metal complex is made of at least one compound selected from the group consisting of the following (a) to (h) compounds:

(a) $ZrOCl_2$, (b) $HfOCl_2$, (c) $CrOCl_2$, (d) $ZnOCl_2$, (e) $AlOCl_2$, (f) $CrCl_3$, (g) $AlCl_3$ and (h) $ZnCl_2$.

It is also preferable in the invention that the active hydrogen atom is derived from at least one group selected from the group consisting of a hydroxyl group, a carboxyl group, an amino group and an imino group.

It is also preferable in the invention that the substrate is subjected to at least one treatment selected from the group consisting of oxidation, alkalization and electron beam irradiation before preparing the chemically adsorbed film.

The invention provides a transparent, highly durable and extremely thin antistatic film whose thickness is at the angstrom or nanometer level. This is accomplished by preparing a monomolecular film comprising straight carbon-chain groups each chemically adsorbed on a substrate via a covalent bond, or by laminating such monomolecular films to build up a multi-monomolecular film, and further making a metal-phosphonate or metal-carboxy complex at the surface of the monomolecular film or multi-monomolecular film. In detail, great antistatic properties are effected by functional groups each forming a weakly conductive complex and connected with the substrate through molecules chemically adsorbed on the substrate. Further, the film will not peel off from the substrate. Moreover, the antistatic film of the invention is so thin that it does not deteriorate the sheen of the film surface. Therefore, the antistatic film is applicable for a variety of articles requiring an antistatic process, such as electrical products and the like.

A preferable constitution of the invention provides an antistatic multi-monomolecular film comprising straight carbon-chain groups each having a phosphonate or carboxyl group at both ends and a metal molecule between the two phosphonate or carboxyl groups. The metal molecules in every deposited monomolecular film improve the antistatic properties of the multi-monomolecular film. A transition metal element is suitable for a metal complex in each film of the invention, since transition metal elements excellently prevent static electricity.

The method of the invention effectively manufactures a monomolecular antistatic film or multi-monomolecular film. In detail, surface resistance is reduced by using a molecule with a phosphonate or carboxyl group at both ends, soaking a monomolecular film in a solution of a metal salt to make a metal complex from the phosphonate or carboxyl group and the metal salt and repeatedly laminating each monomolecular film with the phosphonate or carboxyl group at both ends a plurality times. It results in great antistatic properties.

As explained above, the invention provides a transparent, highly durable and extremely thin antistatic film whose thickness is at the angstrom or nanometer level. Further, the antistatic film does not peel off from the substrate.

The method of the invention relatively freely forms a desirably conductive antistatic film on a substrate by fixing a metal complex for preventing static electricity on the substrate through a molecule chemically adsorbed on the substrate via a covalent bond. The antistatic film does not peel off from the substrate since the monomolecular film or the multi-monomolecular film are chemically bonded to the substrate. Moreover, the thickness of the monomolecular film is at the nanometer level. Consequently, the film does not deteriorate the sheen or the tone of color of the substrate surface.

DETAILED DESCRIPTION OF THE INVENTION

The antistatic film of the invention is applicable for insulating members in industrial materials, e.g., vehicles, electrical products and the like to keep the members from gathering dust. A chemically adsorbed film exhibiting weak conductivity is formed as follows. A monomolecular film is first formed on a substrate using straight carbon-chain groups each having a phosphonate group or a carboxyl group at its end. The resulting film is then soaked in a solution of a metal salt to make a complex of the metal and the phosphonate or carboxyl group. A monomolecular film or a multi-monomolecular film with a low electric resistance protects the substrate from electrostatic charging. The surface resistance on the substrate is reduced more effectively by an antistatic multi-monomolecular film formed according to the method of the invention.

Chemical adsorbents applicable for the invention include the compounds of Formulas (1) to (5) as stated above.

Metal compounds applicable for the invention include (1) $ZrOCl_2$, $HfOCl_2$, $CrOCl_2$, $ZnOCl_2$, $AlOCl_2$ (2) $CrCl_3$, $AlCl_3$ and $ZnCl_2$.

In the invention, active hydrogen groups (hydrophilic groups) on the substrate surface useful in this invention include a hydrogen group, a carboxyl group, an amino group and an imino group. These active hydrogen groups initially on the surface of a substrate can be used as is. When a substrate has no or insufficient amount of such active hydrogen groups, one will create them on the substrate with oxidation, alkalization, electron beam irradiation or the like.

The preferred embodiments will be described with reference to the accompanying drawings. In some Formulas and Figs., an arrow from a substance X to an element Y means that electrons of the substance X are being attracted to the element Y.

EXAMPLE 1

Figure 1A:
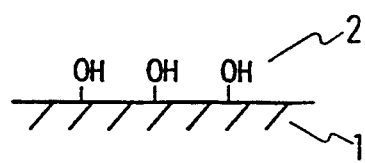
FIGS. 1(a) to 1(d) are schematic sectional views for explaining the process of manufacture of Example 1 of the invention.
Figure 1B:
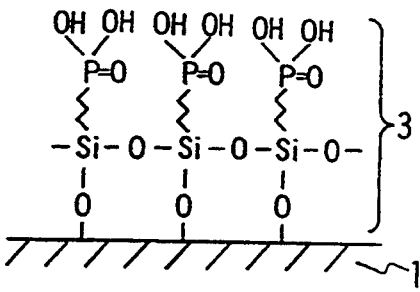

For the glass substrate 1 in FIG. 1(a), a cathode-ray tube (CRT) was washed with an organic solvent and soaked in a solution of a chemical adsorbent at 90° C. for about 1 hour. The solution was previously prepared with a 2 wt % aqueous solution of the chemical adsorbent, $H_2O_3P$—$(CH_2)_3$—$Si(OCH_3)_3$, and hydrochloric acid to adjust its pH to 3. After taking the CRT out of the solution and washing it with water, a monomolecular film 3 in FIG. 1(b) formed on an entire surface of the CRT. At the binding sites, a number of bonds each represented by the following Formula (A) were formed by a condensation reaction of methanol between hydroxyl groups on a display face of the CRT and —Si(OCH3) groups in the chemical adsorbent.

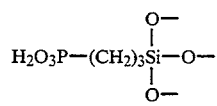

Formula (A)

The monomolecular film 3 chemically bonding to the substrate 1 was several angstroms thick.

Figure 1C:
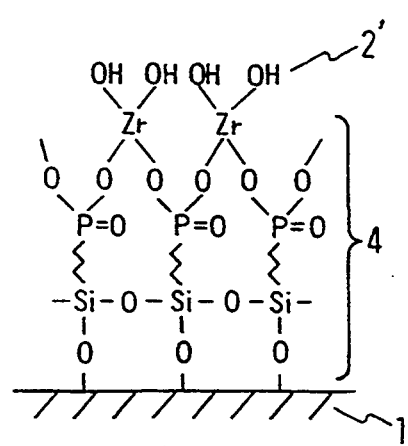

The CRT was then soaked in a 1 wt % aqueous solution of zirconyl chloride (ZrOCl2) at room temperature for about 1 hour and washed with water. This treatment formed a monomolecular film 4 in FIG. 1(c) having hydrophilic hydroxyl groups 2' at the end of the zirconium complex represented by the following Formula (B):

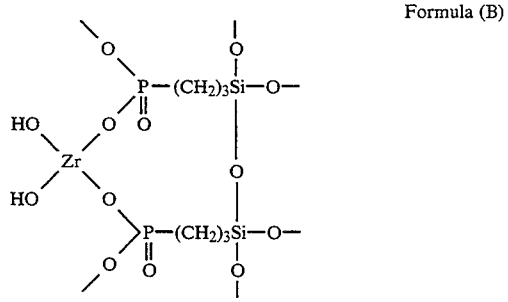

Formula (B)

The monomolecular film 4 bonded to the substrate 1 firmly enough not to peel off. Since the film 4 adsorbed water vapor (moisture) in air, its conductive value rose to about $10^{-8}$ S/cm.

EXAMPLE 2

The CRT was subsequently soaked in another solution of a chemical adsorbent at room temperature for about 1 hour. The solution was previously prepared with a 2 wt % aqueous solution of the chemical adsorbent, $H_2O_3P-(CH_2)_{10}-PO_3H_2$. In that treatment, a number of hydroxyl groups each binding a Zr atom on a display face of the CRT reacted with phosphonate groups to make a complex. After taking that CRT out of the solution and washing it with water, a second monomolecular film was formed on the entire treated surface of the CRT.

Figure 1D:
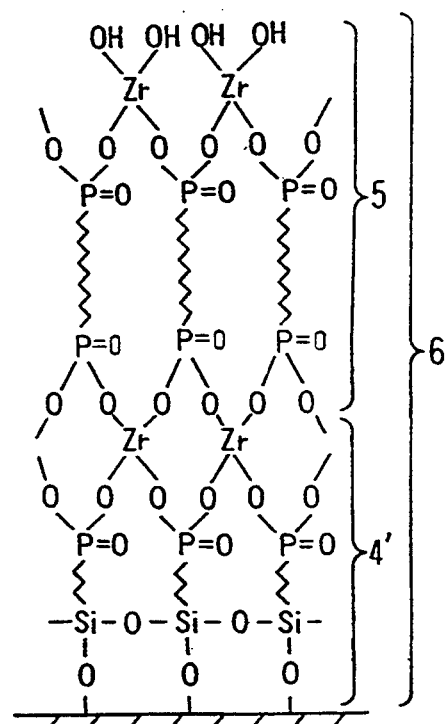
Figure 2A:
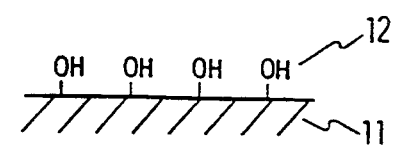
FIGS. 2(a) to 2(d) are schematic sectional views for explaining another process of manufacture of Example 3 of the invention.
Figure 2B:
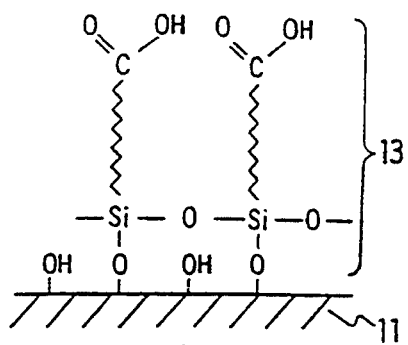
Figure 2C:
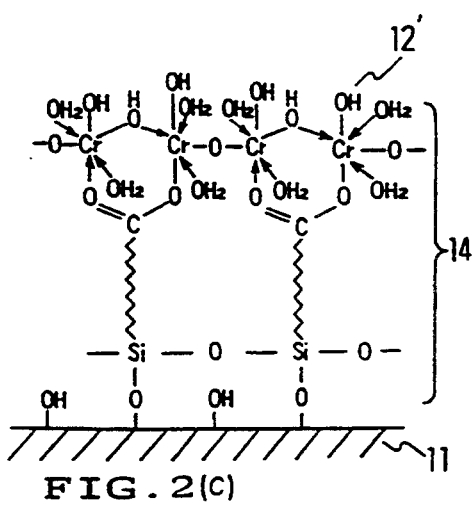
Figure 2D:
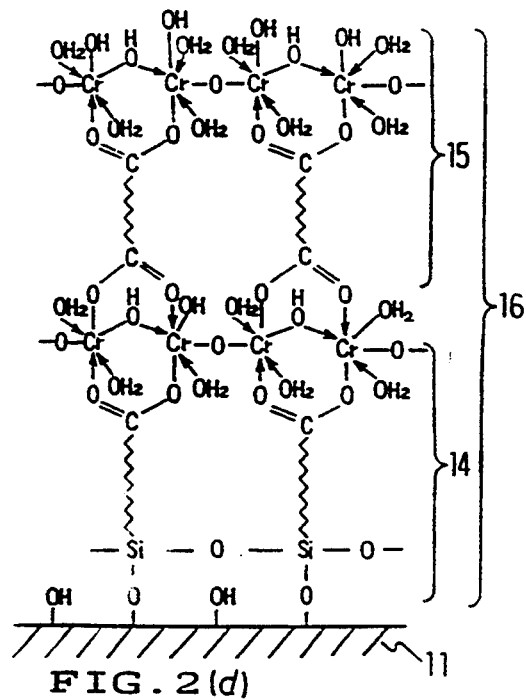

The CRT was soaked again in a 1 wt % aqueous solution of zirconyl chloride (ZrOCl2) at room temperature for about 1 hour and washed with water. This treatment formed another monomolecular film 5 in FIG. 1(d) having hydrophilic hydroxyl groups 2' at the ends. The resulting multi-monomolecular film 6, which was composed of two monomolecular films 4' and 5, included the zirconium complex represented by the following Formula (C):

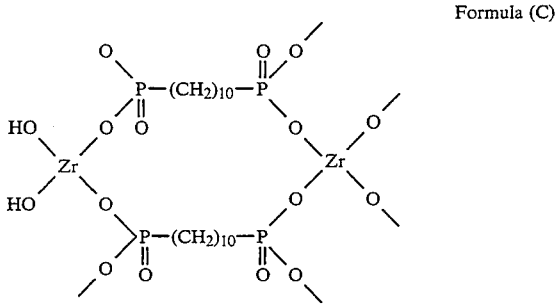

Formula (C)

The multi-monomolecular film 6 bonded to the substrate 1 firmly enough not to peel off. After repeating this process 10 times, the film 6 had a conductive value of about $10^{-7}$ S/cm.

EXAMPLE 3

As a substrate 11 in FIG. 2.(a), an acryl resin plate was treated with oxygen plasma at 300 W for about 10 minutes to slightly oxidize the surface. This oxygen plasma treatment can be replaced with corona discharge. The oxygen plasma treatment formed hydrophilic hydroxyl groups 12, i.e., active hydrogen groups, on the substrate surface.

Next, a solution of a chemical adsorbent was prepared with a 2 wt % solution of the chemical adsorbent, $CH_3OOC(CH_2)_{11}SiCl_3$ in a non-aqueous solvent, 80 vol % n-hexadecane. This solvent can be replaced with toluene, xylene, or dicyclohexyle. Other examples of the solvent include 12 vol % carbon tetrachloride and 8 vol % chloroform. The substrate 11 was soaked in the solution at room temperature for about 5 hours. Then, a great number of the hydroxyl groups 12 on the substrate 11 reacted with —SiCl3 groups in the chemical adsorbent, resulting in a dehydrochlorination reaction to produce the composition represented by the following Formula (D):

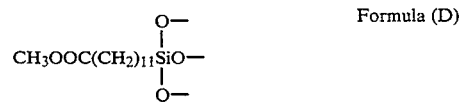

Formula (D)

The resulting monomolecular film (not shown in FIG. 2), which had an ester bond, was about 20 angstroms thick, and chemically bonded to the substrate 11. Next, the monomolecular film was treated with a 36 wt % aqueous solution of hydrogen chloride (HCl) at 65° C. for 30 minutes. This treatment changed the end of the above composition to another one of the following Formula (E), thus forming a monomolecular film 13 (FIG. 2(b)).

Formula (E)

The monomolecular film 13 bonded to the substrate 1 firmly enough not to peel off.

The film 13 was then soaked again in a 1 wt % aqueous solution of chromium chloride (CrCl3) at room temperature for about 1 hour and washed with water. This step changed the film 13 to a monomolecular film 14 (FIG. 2(c)) with hydrophilic hydroxyl groups 12' at the end and the chromium complex represented by the following Formula (F):

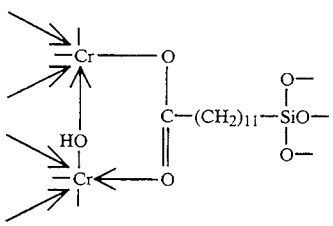

Formula (F)

The monomolecular film 14 bonded to the acryl resin plate substrate 11 firmly enough not to peel off. Since the film 14 adsorbed water vapor (moisture) in air, its conductive value rose to about $10^{-8}$ S/cm.

EXAMPLE 4

Subsequently, the acryl resin plate coated with the monomolecular film 14 was soaked in another solution of a chemical adsorbent for about 1 hour. The solution was previously prepared with a 2 wt % aqueous solution of the chemical adsorbent, $HOOC-(CH_2)_7-COOH$. In that soaking treatment, a number of hydroxyl groups 12' (FIG. 2(c)) binding Cr atoms in the film 14 reacted with phosphonate groups to form another monomolecular film (not shown in FIG. 2) on the entire surface of the acryl resin plate.

The plate was soaked again in a 1 wt % aqueous solution of chromium chloride ($CrCl_3$) at room temperature for about 1 hour and washed with water. This step formed another monomolecular film 15 (FIG. 2(d)) with hydrophilic hydroxyl groups at the end on the film 14. The resulting multi-monomolecular film 16, which was composed of the double monomolecular films 14 and 15, included the chromium complex represented by the following Formula (G):

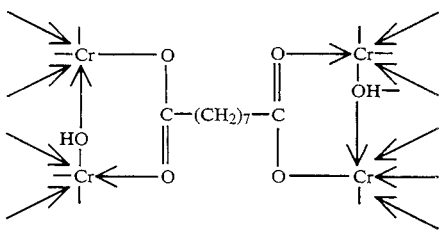

Formula (G)

The multi-monomolecular film 16 bonded to the substrate 1 firmly enough not to peel off. After repeating this process 12 times, the conductive value of the film 16 was about $10^{-7}$ S/cm.

The invention may be embodied in other specific forms without departing from the spirit or essential characteristics thereof. The present embodiments are to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. An antistatic film comprising a molecule with a straight carbon-chain group chemically adsorbed and bonded to a substrate via a covalent bond, the film being a monomolecular film or a multi-monomolecular film, wherein said molecule with a straight carbon-chain group comprises at least one metal complex selected from the group consisting of a metal-phosphonate complex and a metal-carboxy complex.

2. An antistatic multi-monomolecular film according to claim 1, wherein the molecule with a straight carbon-chain group has at both ends a group selected from the group consisting of a phosphonate group and a carboxyl group, and a metal molecule is present between the phosphonate group or carboxyl group and the straight-chain carbon group at both ends.

3. An antistatic film according to claim 1, wherein the metal in said metal complex is a transition metal element.

4. An antistatic film according to claim 1, wherein said metal complex comprises at least one metal element selected from the group consisting of Zr, Hf, Cr, Zn and Al.

5. An antistatic film according to claim 1, wherein said substrate comprises at least one material selected from the group consisting of plastic, ceramics, glass, metal, semiconductors, resins, rubber, fibers, paper and fabrics.

6. A method of manufacturing an antistatic film comprising the steps of:
   subjecting a substrate having an active hydrogen-containing group on its surface to a condensation reaction with a chemical adsorbent containing a straight carbon-chain group with a silyl group at a first end and one group selected from the group consisting of a phosphonate group and a carboxyl group at a second end to form a monomolecular film; and
   soaking said monomolecular film in a solution of a metal salt to react said one group selected from the group consisting of a phosphonate group and a carboxyl group on said monomolecular film with said metal salt to form a metal complex.

7. A method according to claim 6, further comprising the step of repeatedly laminating each monomolecular film of the molecule having one group selected from the group consisting of a phosphonate group and a carboxyl group at the ends a plurality of times to form a multi-monomolecular film, wherein said metal complex is made of a metal salt and a phosphonate group or a carboxyl group.

8. A method according to claim 6, wherein said straight carbon-chain group in the chemical adsorbent is derived from at least one compound selected from the group consisting of:

(A) a compound represented by the following Formula (1), comprising a straight carbon chain group with a phosphonate group at one end and a silylmethoxy group at the other end:

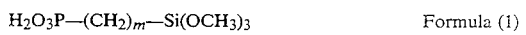

$$H_2O_3P-(CH_2)_m-Si(OCH_3)_3 \qquad \text{Formula (1)}$$

wherein m denotes an integer of 1 to 30;

(B) a compound represented by the following Formula (2), comprising a straight carbon-chain group with a phosphonate group at one end and a thiol group at the other end:

$$H_2O_3P-(CH_2)_n-SH \qquad \text{Formula (2)}$$

wherein n denotes an integer of 1 to 30;

(C) a compound represented by the following Formula (3), comprising a straight carbon-chain group with a phosphonate group at both ends:

$$H_2O_3P-(CH_2)_u-PO_3H_2 \qquad \text{Formula (3)}$$

wherein u denotes an integer of 1 to 30;

(D) a compound represented by the following Formula (4), comprising a straight carbon-chain group with an ester bond at one end and a chlorosilyl group at the other end:

$$R-OOC(CH_2)_vSiCl_3 \qquad \text{Formula (4)}$$

(E) a compound represented by the following Formula, comprising a straight carbon-chain group with a carboxyl group at both ends:

$$HOOC-(CH_2)_w-COOH \qquad \text{Formula (5)}$$

wherein w denotes and integer of 1 to 30.

9. A method according to claim 6, wherein said chemical adsorbent comprises a compound represented by Formula (4), which comprises a straight carbon-chain group with an ester bond at one end and a chlorosilyl group at the other end:

$$R-OOC(CH_2)_vSiCl_3 \qquad \text{Formula (4)}$$

wherein R represents a $C_{1-6}$ lower alkyl group, and v denotes an integer of 1 to 25, further comprising the steps of bonding said compound to a surface of the substrate via a covalent bond and changing a carboxylate of said compound to a carboxyl group by an acid treatment.

10. A method according to claim 6, wherein said metal salt is at least one compound selected from the group consisting of:
(a) $ZrOCl_2$, (b) $HfOCl_2$, (c) $CrOCl_2$, (d) $ZnOCl_2$, (e) $AlOCl_2$, (f) $CrCl_3$, (g) $AlCl_3$ and (h) $ZnCl_2$.

11. A method according to claim 6, wherein said active hydrogen containing group is at least one group selected from the group consisting of a hydroxyl group, a carboxyl group, an amino group and an imino group.

12. A method according to claim 6, wherein said step of subjecting said substrate further comprises a step of carrying out one treatment selected from the group consisting of oxidation, alkalization and electron beam irradiation before preparing the chemically adsorbed film.

* * * * *